March 26, 1940.  M. J. SASGEN  2,194,510
DOOR STOP
Filed Jan. 18, 1939
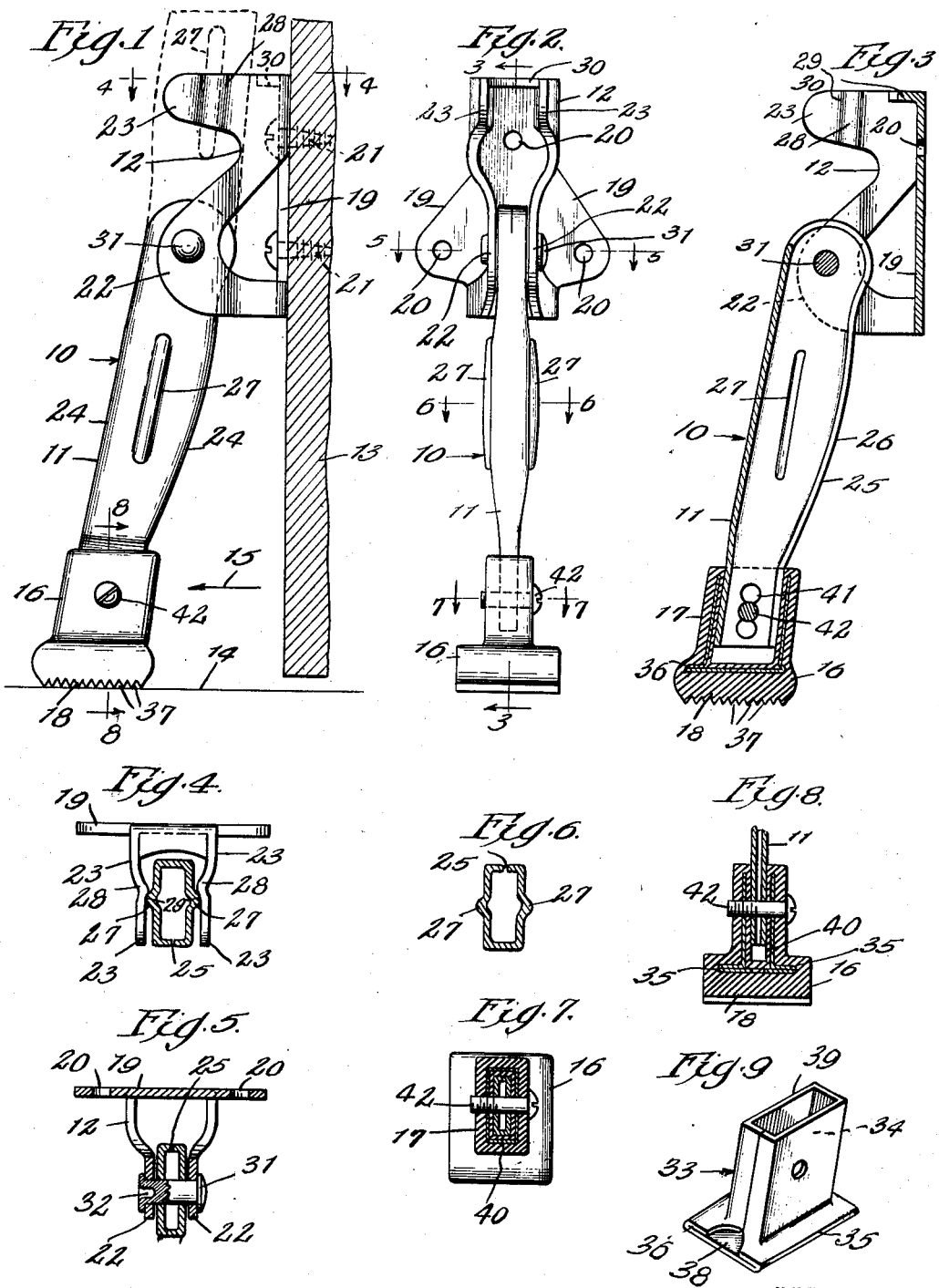
INVENTOR.
Michael J. Sasgen.
BY Edward Jay Wilson
ATTORNEY.

Patented Mar. 26, 1940

2,194,510

UNITED STATES PATENT OFFICE 2,194,510

DOOR STOP

Michael J. Sasgen, Chicago, Ill.

Application January 18, 1939, Serial No. 251,522

6 Claims. (Cl. 292—338)

This invention relates to improvements in door stops of the pivoted lever type.

The object of the invention is to provide a door stop of this character which shall have an improved means for holding the lever in raised inoperative position; the lever of which shall be formed or folded up out of sheet metal and shall present a very artistic appearance; which shall have an adjustable shoe on its floor contacting end, of simple construction and having a substantially water-tight connection with the lever.

The device includes a base plate upon which one end of the lever is pivotally connected, the base including two rather stiff struck up ears between which the lever is received and an important feature of the invention resides in the fact that the lever is slightly resilient sidewise so that it does not depend so much upon the resiliency of the ears for engagement to hold the lever in raised position.

Other beneficial features will appear from the following description taken in conjunction with the accompanying drawing, forming part of this specification, and the appended claims.

The invention will be more readily understood by reference to said drawing, in which—

Fig 1 is a side elevation of my improved door stop shown in operative position in full lines and the lever down in inoperative position in dotted lines;

Fig. 2 is a front elevational view of the stop shown in Fig. 1;

Fig. 3 is a vertical, central section on the line 3—3 of Fig. 2;

Fig. 4 is a horizontal section on the line 4—4 of Fig. 1;

Figs. 5, 6 and 7 are horizontal sections taken respectively on the lines 5—5, 6—6 and 7—7 of Fig. 2;

Fig. 8 is a vertical, fragmentary section on the line 8—8 of Fig. 1; and

Fig. 9 is a perspective view of the foot piece before it is covered with rubber.

In said drawing, 10 represents generally my improved door stop. The stop comprises a stop lever 11 pivotally mounted at its upper end on a base bracket 12 which is adapted to be secured to a door 13 near its lower end and in such position that the lower or free end of the lever 11 will contact with the floor 14 to prevent the door swinging in the direction of the arrow 15 on Fig. 1. The floor contacting end of the lever 11 is provided with a shoe 16 having a rubber covering 17 including a rubber pad 18 at the bottom for contact with the floor.

The base bracket 12 is formed up out of sheet metal and has a back plate 19 which is provided with holes 20 for receiving screws 21. The bracket 12 is formed with two laterally extending projections at its lower end and with two pairs of forwardly extending projections 22 near its lower end and 23 at its upper end.

The projections of each of these pairs extend forwardly in parallel relation. The lower pair 22 provides the pivotal mounting for the lever 11 and the upper pair 23 is adapted to co-operate with the lever 11 to hold it in raised or inoperative position, as indicated in dotted lines in Fig. 1.

The lever 11 is also formed up out of sheet metal and is made hollow as shown, among other reasons so that it may be provided with smooth rounded edges 24 and for lightness and stiffness. The seam 25 between the edges of the sheet of which the lever 11 is formed, extends centrally at the rear side of the lever from end to end of the lever and these edges are slightly separated for a purpose to be explained.

As shown in Fig. 3, the lever 11 is rounded out as shown at 26, to aid in stiffening the lever and to give it an artistic appearance. Between the ends of the lever 11, the side walls are formed outwardly to provide longitudinally extending transversely rounded ridges or projections 27 in position to be arranged between the upper pair of projections 23 on the base 19 to hold the lever in raised position. As best shown in Fig. 4, the projections 23 are provided with vertically extending shoulders 28 against which the projections 27 contact when the lever 11 is fully raised. Just in front of the shoulders 28 the projections 23 are provided with shallow vertical grooves 29 (see Figs. 3 and 4) into which the rounded projections 27 on the lever, snap as the lever reaches its uppermost position.

It should be understood that the projections 23 are quite rigid though they have a slight resiliency, and for this reason the edges of the hollow lever 11 are left slightly separated so that as it is raised it can be readily forced to its holding position and without undue wear.

The ridges 27 are made even longer than the vertical width of the projections 23, and are so placed that they contact with the projections 23 throughout the entire width of the projections and thus tend to reduce wear to a minimum and so that the device will remain in proper operative condition indefinitely. Another benefit of making the ridges 27 rather long is that this facilitates in the manufacture of different sizes of stops in which the relationship of the ridges 27 and the projections may vary to some extent but even so, the ridges 27 will properly contact with the projections 23.

The base 21 of the bracket 12 is turned inwardly at its upper end as shown at 30 and this gives a finished appearance to the upper end of the bracket.

This turned in wall is formed to fit tightly between the projections 23 and serves to assist in preventing the projections 23 being displaced in use.

The pivot 31 upon which the lever 11 is mounted on the bracket 12, is preferably in the form of a rounded headed rivet, and I secure the rivet in place by first providing a central hole 32 in the end to be riveted and then by means of a special tool I round down the thin wall produced by the hole 32, thus producing a smooth finish to the rivet.

As shown, the lever 11 is free between the projections 22, and the hole for the rivet 31 is slightly larger than the diameter of the rivet and this allows a slight lateral swing or lateral movement to the lever which assists in the firm contacting of the shoe 16 with the floor if the floor and door are not quite true with each other.

The side walls of the lever 11 are formed closer together at its ends than at its intermediate portion so that at its pivoted end the projections 22 can be brought in closer together and at its bottom end the shoe 16 will not be so large.

The shoe 16 comprises an inner box-like shell 33 formed up out of sheet metal to provide a hollow projection 34 and the walls of which are spread out and flattened to provide a horizontal flange 35 which extends along each side and across the forward end 36. The shell 33 is covered inside and out with the vulcanized on, rubber cover 17 which is thickened at the bottom to provide the pad 18 for contact with the floor, and which is preferably formed with transversely extending V-shaped ridges 37 to assist in gripping the floor.

The upper part of the toe flange 36 is cutaway at its middle portion as shown at 38, to permit the rubber at this point to be firmly vulcanized to the lower part of the flange 36, both on its bottom surface and on its top surface. The opening 39 which is provided in the shell 34 to receive the lower end of the lever 11, is slightly larger in cross-section than the lever and this leaves room to provide a thin covering of the rubber as shown at 40. This lining of rubber is arranged to fit snugly upon the lower end of the lever and assists in preventing water or moisture entering between the lever and the shoe, which would tend to rust same, and the lining provides a tight fit between the lower end of the lever and the shoe and holds the shoe rigidly in position.

To secure the shoe 16 upon the lever 11, the lower end of the lever is provided with an elongated central longitudinal slot 41 which is enlarged at a plurality of points to receive a screw 42 which extends laterally through the shoe and the lever. By moving the screw 42 from one enlargement to another, it is obvious that the lever can be varied in length to suit the circumstances.

As many modifications of the invention will readily suggest themselves to one skilled in the art, I do not limit or confine the invention to the specific features of construction herein shown and described except within the scope of the appended claims.

I claim:

1. In a door stop of the kind described, a hollow lever, a base plate upon which the lever is pivotally mounted to swing up and down, a pair of relatively rigid projections on the base plate between which the body of the lever is received when raised to inoperative position, the lever being slightly resilient laterally for facilitating its entrance between said projections.

2. The invention as defined in claim 1, the side walls of the lever provided with longitudinally extending rounded ridges for contact with said projections on the base, and said projections provided on their inner surfaces with slight longitudinally extending grooves for receiving said rounded ridges.

3. The invention as defined in claim 1, the side walls of the lever provided with longitudinally extending rounded ridges for contact with said projections on the base, and said projections provided on their inner surfaces with slight grooves for receiving said rounded ridges, and vertical stop shoulders on said projections on the base for preventing the further inward movement of the lever.

4. In a door stop of the kind described, a lever proper which is formed of sheet metal and is hollow, the lever having front and rear walls joined at each side by a side wall, the lever formed to have a substantial thickness and yet be light in weight, a base plate upon which one end of the lever is pivotally mounted to swing up and down, a pair of forwardly projecting ears on the base plate between which the body of the lever is received when in inoperative position, the lever being slightly resilient laterally for entering freely between said ears.

5. In a door stop, a lever, a base plate upon which the lever is pivotally mounted to swing to operative or inoperative position, a pair of relatively rigid projections on the base plate between which the body of the lever is received when raised to inoperative position, the lever being slightly resilient laterally for facilitating its entrance between said projections.

6. In a door stop of the kind described, a hollow lever proper formed out of sheet metal and having solid front and side walls and a split rear wall and ends, the split extending longitudinally of the lever and spacing the portions of the rear wall slightly from one another to give to the lever a slight lateral resiliency, the ends of the lever being reduced in thickness over the intermediate portion of the lever.

MICHAEL J. SASGEN.